United States Patent [19]
Anzai

[11] Patent Number: 5,223,952
[45] Date of Patent: Jun. 29, 1993

[54] IMAGE RECORDING DEVICE AND A DATA PROCESSING APPARATUS

[75] Inventor: Masayasu Anzai, Hitachi, Japan
[73] Assignee: Hitachi, Ltd., Tokyo, Japan
[21] Appl. No.: 742,487
[22] Filed: Aug. 5, 1991

Related U.S. Application Data

[63] Continuation of Ser. No. 593,283, Oct. 5, 1990, abandoned, which is a continuation of Ser. No. 379,189, Jul. 13, 1989, abandoned.

[30] Foreign Application Priority Data

Jul. 13, 1988 [JP] Japan ................. 63-172586

[51] Int. Cl.⁵ .............................. H04N 1/40
[52] U.S. Cl. ........................ 358/451; 358/474
[58] Field of Search ............... 358/75, 80, 400, 401, 358/448, 451, 459, 429, 296.11, 474; 250/202; 346/108

[56] References Cited

U.S. PATENT DOCUMENTS

4,422,102 12/1983 Tamura ................. 358/296
4,742,363 5/1988 Shiraishi ................. 358/296

Primary Examiner—Edward L. Coles, Sr.
Assistant Examiner—Jerome Grant, II
Attorney, Agent, or Firm—Antonelli, Terry, Stout & Kraus

[57] ABSTRACT

An image recording device of an optical beam scanning type comprising at least one variable frequency generating source which can arbitrarily change the recording density in the main-scanning direction and/or the recording density in the sub-scanning direction for recording an image with an arbitrary dimension without information on the original image.

16 Claims, 6 Drawing Sheets

IMAGE RECORDING DEVICE AND A DATA PROCESSING APPARATUS

This application is a continuation of application Ser. No. 593,283, filed on Oct. 5, 1990 now abandoned, which is a continuation of application Ser. No. 379,189, filed on Jul. 13, 1989, now abandoned.

FIELD OF THE INVENTION

The present invention relates to an image recording device using an optical beam and particularly to an image recording device which is capable of arbitrarily changing the size of a printed image, and a data processing apparatus using the image recording device.

BACKGROUND OF THE INVENTION

Figure 1:
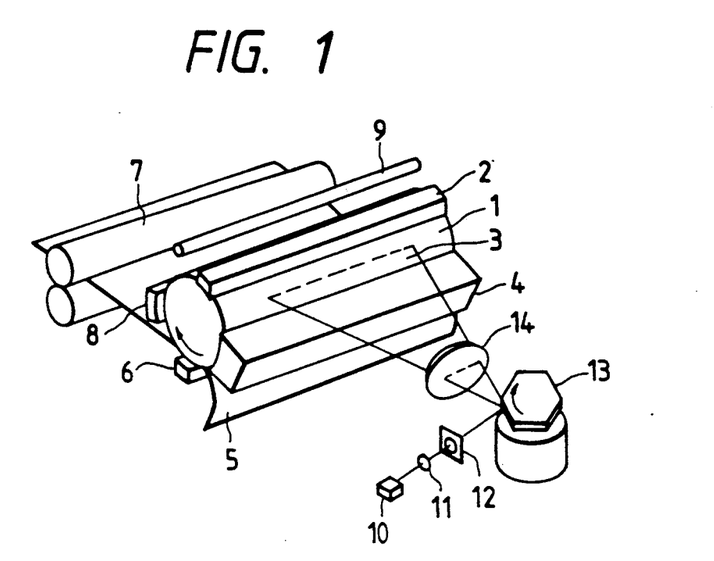
FIG. 1 is a diagram showing prior art.

An image recording device as illustrated in FIG. 1 is known in the art using an optical beam, for example, from the Japanese Patent Application Publication No. 55-47392 which corresponds to the U.S. Pat. No. 4,046,471.

In FIG. 1, a photographic drum 1 is rotated in the direction shown by the arrow, its main surface is corona-electrified by a charger 2 and then exposed by an optical beam such as a laser beam 3, and a latent charge image is formed on the surface of the photosensitive drum 1. The laser beam 3 scans a first line on the surface of the photosensitive drum 1 substantially parallel to an axis of the photosensitive drum 1, which is called a main-scanning direction. After scanning a first line, the laser beam 3 scans a second line in the main-scanning direction according to rotation of the photosensitive drum 1. A sub-scanning direction is at substantially right angles to the main-scanning direction, in other words, the rotational direction of the photosensitive drum 1 is the sub-scanning direction.

This latent charge image is developed in the well known manner of positive to negative work by a developer 4 and at least one color toner image is formed on the surface of photosensitive drum 1. A recording material such as paper 5 is pressed continuously onto the surface of the photosensitive drum 1 and the above toner image is transferred to the recording paper 5 by the operation of a transferror 6. The toner image transferred to the recording paper 5 is heat-fixed by a fixer 7 and becomes a printed image on the recording paper 5. As for the photosensitive drum 1, the toner remaining on the photosensitive drum 1 is removed by a cleaner 8 after the toner image is transferred to the recording paper 5. The charge remaining on the photosensitive drum 1 is erased by an eraser lamp 9, and the photosensitive drum 1 is brought to the state where printing is possible again as mentioned above.

A toner image is formed on the recording paper 5 by exposure to the laser beam 3 as mentioned above. The recording density of the image in the sub-scanning direction on this recording paper 5 is determined by the scanning line density in the sub-scanning direction of the laser beam 3 and the rotational speed of the photosensitive drum 1, and in this way, the image dimension in the sub-scanning direction of the screen in determined. In addition, the image dimension in the main-scanning direction is decided by the modulation frequency of an image signal for modulating the laser beam 3 and the main-scanning speed of the laser 3.

Scanning by the laser beam 3 according to the above mentioned prior art is carried out at a constant speed using reflected laser light, modulated at a constant modulation frequency from a laser diode 10, by a polygon mirror 13 rotated at a constant speed through a coupling lens 11 and a diaphragm 12, and by focusing it on the surface of the photosensitive drum 1 with a scanning lens 14. In addition, the rotary moving speed of the photosensitive drum 1 is constant. Therefore, an image signal transmitted to the printer at a constant speed can be recorded only by a predetermined fixed image dimension, and images cannot be recorded on paper with an arbitrary dimension of the arbitrary size in the prior art.

The above prior art does not consider recording an image signal whose original is of arbitrary size and has a problem in that it cannot print the image at an arbitrary size corresponding to the dimension of the paper to obtain an arbitrary image whose dimensions are different from that of the originally predetermined format size.

Furthermore, it is known that the host computer having the original signal source can modify the image signal to an arbitrary size, and can transmit the modified image signal to the laser beam printer. (P. J. Burt: Fast filter transforms for image processing, Comput. Graphics, Image Processing, vol. 16, pp. 20-51 (1981)).

However, this causes the host computer to spend more time to control the printer. It also results that the modified image signal looses information because the recording density in the main-scanning direction of the laser beam and the recording density in the sub-scanning direction of the laser beam are constant.

SUMMARY OF THE INVENTION

The object of the present invention is to avoid the mentioned problems in the art and to provide an image recording device and a data processing apparatus which are capable of recording an image with an arbitrary dimension such as magnification and reduction without losing information on the original image.

According to the present invention at least one variable frequency generating source is provided which can arbitrarily change the recording density in the main-scanning direction and/or the recording density in the sub-scanning direction. The foregoing and other objects and features of the present invention will be apparent from the following more detailed description of the preferred embodiments, taken in conjunction with the accompanying drawings.

BRIEF DESCRIPTION OF THE DRAWINGS

FIGS. 4(a-d) are diagrams showing examples of diaphragm and laser beam spot shapes.

FIGS. 5(1-3) are diagrams showing the characteristics of the image recorded by the laser beam printer and an improved method according to the present invention.

DETAILED DESCRIPTION OF THE PREFERRED EMBODIMENTS

Figure 2:
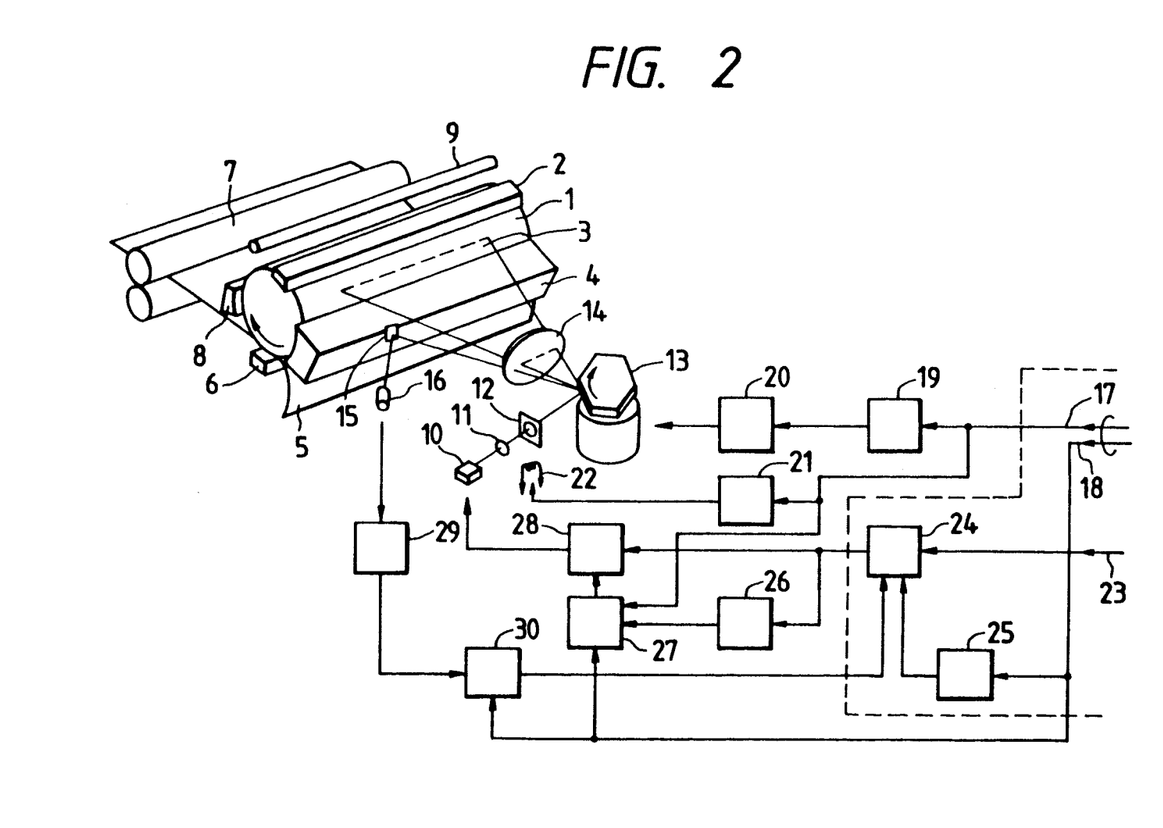
FIG. 2 is a block diagram showing the configuration of a preferred embodiment.

In FIG. 2, the photosensitive drum 1, the charger 2, the laser 3, the developer 4, the recording material such as paper 5, the transferror 6, the fixer 7, the cleaner 8, the eraser 9, the laser diode 10, the coupling lens 11, the diaphragm 12, the polygon mirror 13 and the scanning lens 14 have the same function as in the above mentioned FIG. 1.

A mirror 15 reflects part of the laser beam 3, and a beam detector 16 detects the reflected beam from the mirror 15. A longitudinal magnification designation signal 17 identifies the recording magnification (the recording density in the sub-scanning direction), and a lateral magnification designation signal 18 identifies the recording magnification (the recording density in the main-scanning direction). A first variable frequency generating source such as an alternating current power source frequency oscillator 19 receives the longitudinal magnification signal 17 and generates an alternating current power source signal which has an oscillation frequency corresponding to the longitudinal magnification signal 17. A mirror driver 20 receives the signal generated by the alternating current power source frequency oscillator 19 and drives the motor for driving the polygon mirror 13.

A spot diameter switching circuit 21 receives the longitudinal magnification designation signal 17 and drives a diaphragm- adjustment driving coil 22. A digital or an analog image signal, for example a video signal 23 is stored in a memory 24 and is read out in accordance with a clock signal generated by a second variable frequency generating source such as an image reading clock generating circuit 25 and a timing signal generated by a horizontal writing position designation circuit 30. An image discrimination circuit 26 receives the image signal read out from the memory 24 and outputs a signal to control a light control circuit 27, and the light control circuit 27 receives the longitudinal magnification designation signal 17, the lateral magnification signal 18 and the signal from the image discrimination circuit 26. A laser driver 28 receives the image signal read out from the memory 24 and a control signal generated by the light control circuit 27. The laser driver 28 drives and controls the laser diode 10. The image reading clock generating circuit 25 receives the lateral magnification designation signal 18. The horizontal writing position designation circuit 30 receives the lateral magnification designation signal 18 and a signal generated by a beam detector signal shaping circuit 29 which receives a signal form the beam detector 16.

Suppose that the standard recording density of an image is 157.48 dots/cm (400 dots/inch) in the illustrated preferred embodiment in FIG. 2 and the recording magnification or the recording density is determined by the longitudinal magnification designation signal 17 and the lateral magnification designation signal 18 and information to be recorded is given by the image signal 23, which are transmitted from the original signal source such as a host computer and a transmitter in a facsimile system. The longitudinal magnification designation signal 17 and the lateral magnification designation signal 18 are produced by a predetermined stored program in the host computer, or in the manner that an operator inputs through a keyboard, or by a calculation based on information identifying a size of the transmitting signal contained in the signal from the transmitter and information identifying a size of recording paper in the facsimile system.

Under the above mentioned conditions, a case will be explained in which the image signal 23 is printed after being reduced by ½ times the size in the main-scanning direction and in the sub-scanning direction, which would be obtained if it were printed by the standard recording density.

Figure 8A:
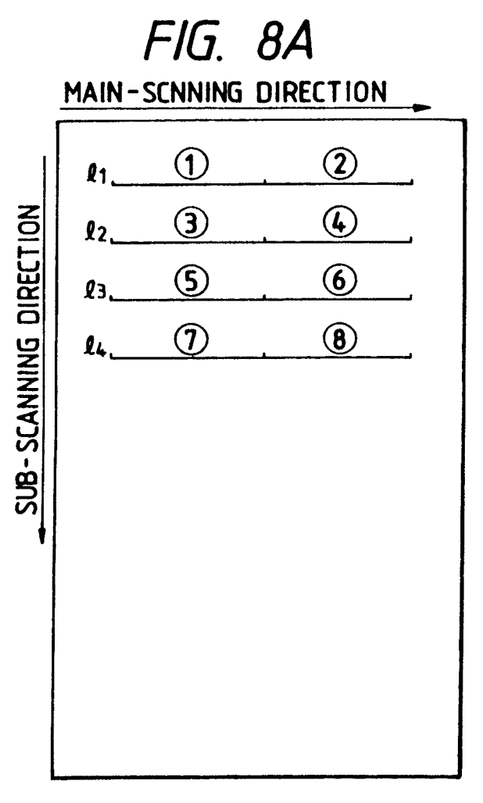

FIG. 8A is a diagram illustrating an example of the printed image of the original image signal according to the standard recording density. There are 4 main-scanning lines, and each of the lines $l_1$-$l_4$ comprises two parts ①and ②, ③ and ④, ⑤ and ⑥, ⑦ and ⑧, respectively.

Figure 8B:
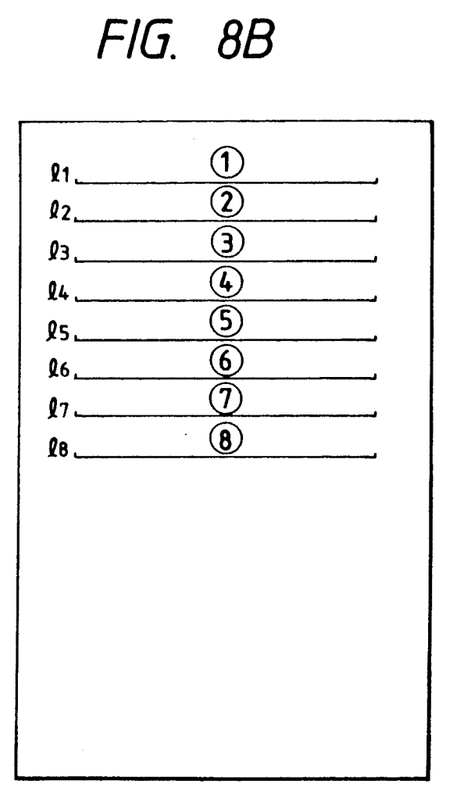

In this case, the alternating current power source frequency oscillator 19 for the mirror motor receives the longitudinal magnification designation signal 17 which identifies ½ times recording density in the sub-scanning direction and doubles its oscillation frequency. In this way, the motor for driving the polygon mirror 13 is driven at twice the rotational speed of standard recording by the mirror driver 20. Therefore, the scanning speed of the laser beam 3 which is scanned by the hexahedral polygon mirror 13 is doubled. If the rotary speed of the photosensitive drum 1 is substantially constant, for example 80 mm/s and the photosensitive drum 1 is driven at substantially the same speed as standard recording, the movement of the surface of the moving photosensitive drum 1, that is, the distance the image moves in the sub-scanning direction in the time it takes for the laser beam 3 to scan once becomes half of the standard recording time since the scanning speed of the laser beam 3 is doubled. Namely, the recording density in the sub-scanning direction is doubled to 314.96 dots/cm (800 dots/inch) as shown in FIG. 8B. In this case, information for the image signal 23 can be recovered without any loss.

If the spot diameter of the laser beam 3 maintains the same size as the standard recording, overexposure between the dots in the sub-scanning direction could occur. Then, the spot diameter switching circuit 21 approximately doubles the hole diameter of the diaphragm 12 by receiving the longitudinal magnification designation signal 17 and driving the diaphragm adjusting driving coil 22, and reduces the spot diameter of the laser beam 3 to ½ of the standard recording. The diaphragm diameter becomes larger and the spot diameter of the laser beam 3 becomes small because of the characteristics of the optical lens system 11, 14. The spot diameter of the laser beam 3 is inversely proportional to the hole diameter of the diaphragm 12 through the scanning lens 14. Moreover, at this time, the light intensity at the focus of the laser beam 3 increases approximately four times per unit area even if all of the energy of the laser beam passing through the diaphragm 12 is constant. Then, the light control circuit 27 receives the longitudinal magnification designation signal 17 and determines according to a predetermined program that the scanning speed of the laser beam 3 in the main-scanning direction has doubled, adjusts the action point of the laser diode 10 through the laser driver 28 and sets the laser output power from the laser diode 10 at about ¼ of the standard recording. Moreover, the light control circuit 27 preferably receives the lateral magnification designation signal 18. Then the laser output power from the laser diode 10 is also set corresponding to the lateral magnification designation signal 18.

The emission power distribution of the laser beam 3 outputted from the laser diode 10 is a Gaussian distribution, and an effective spot diameter can be changed in a practical range by changing the emission power of the laser diode 10. Therefore, in the above preferred embodiment, if the recording accuracy is sacrificed somewhat, the adjustment of the diameter of the diaphragm 12, which is carried out each time the recording magnification is changed, must not necessarily be made. In this case, it is possible to adopt a method to decide the adjustment level of the emission strength of the laser diode 10 in advance by using images.

In addition to the above mentioned changing of the recording density in the sub-scanning direction, both changing the spot diameter of the laser beam 3 and changing the emission power of the laser diode 10 could be combined.

Next, a method to produce the image dimension in the main-scanning direction to ½ by the lateral magnification designation signal 18 is explained.

Figure 8C:
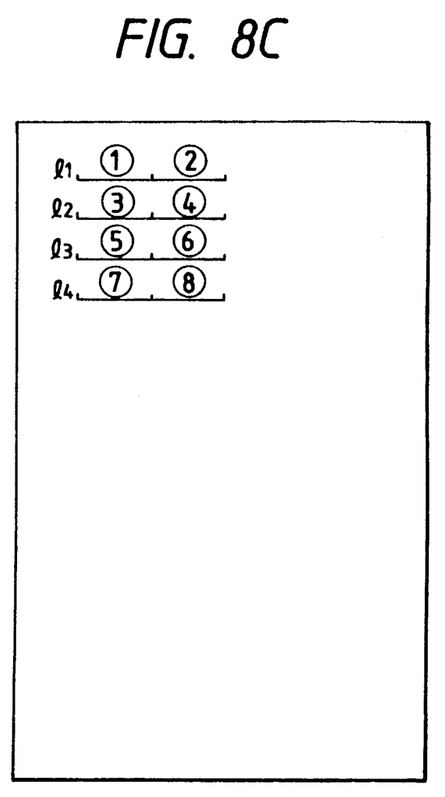

The scanning speed of the laser beam 3 is doubled, as mentioned above, since the rotational speed of the polygon mirror 13 is twice the standard recording speed. Accordingly, if the semiconductor laser 10 is modulated by the transmitted image signal (video signal) 23, the recorded image is enlarged to double the dimensions in the main-scanning (horizontal) direction as shown in FIG. 8B. Therefore, in the preferred embodiment of FIG. 2, images in the main-scanning direction as shown in FIG. 8C are reduced by ½ by transmitting the image signal to the laser driver 28 which modulates the laser diode 10 at four times the speed of standard recording. The working principle is explained in the following:

The image signal 23 is stored once in the memory 24 and is then read out by the clock signal from the image reading clock generating circuit 25 and the timing signal from the horizontal writing position designation circuit 30, and is put into the laser driver 28. The laser driver 28 drives and controls the laser diode 10 using this image signal and photo-modulates the laser beam 3. In the image reading clock generating circuit 25, its frequency is controlled by the lateral magnification designation signal 18. In this preferred embodiment, since the recording dimensions of the image in the main-scanning direction are ½ of the standard recording, the clock frequency of the above clock generating circuit 25 is set at four times the level for the standard dimension. The laser beam 3 is modulated and scanning is carried out by the image signal in each main-scanning line, which is read out from the memory 24 at intervals of one main-scanning line and controlled by the clock signal of this four-fold frequency at intervals of one main-scanning line controlled by the output signal of the horizontal writing position designation circuit 30. The dimensions of the recorded image are reduced to ½ in the main-scanning direction compared with a standard recording as shown in FIG. 8C.

On the other hand, it is preferably necessary to control the starting position of the image signal in the main-scanning direction corresponding on the photosensitive drum 1 to the change of magnification in the main-scanning direction. This is because it is preferably necessary to correct differences in the starting position since the scanning speed of the laser beam 3 is changed in proportion to the change in the rotational speed of the polygon mirror 13. Therefore, in this preferred embodiment, the mirror 15, the beam detector 16, the beam detector signal shaping circuit 29 and the horizontal writing position designation circuit 30 are provided. Part of the laser beam 3 is reflected by the mirror 15, the beam position is detected by the beam detector 16 and is shaped by the beam detector signal shaping circuit 29. The horizontal writing position designation circuit 30 detects the beam position of the laser beam 3 using the beam detector 16 and then controls the time to start reading out the image signal in one scanning line from the memory 24 calculated from the scanning speed of the beam spot. Therefore, the horizontal writing position designation circuit 30 receives the lateral magnification designation signal 18, carries out the above calculation, delays a beam detector pulse signal based on this and regulates the starting time to read out the image signal in one scanning line of the memory 24 from the horizontal head position in the main-scanning direction. In this way, images can be recorded at the designated positions. In case the magnification in the main-scanning direction is half of the standard recording, as the scanning speed of the laser beam 3 is doubled by the polygon mirror 13, the horizontal writing position designation circuit 30 can make the starting position of the image the same as the standard recording by setting a delay time for the beam detector pulse signal from the shaping circuit 29 at half the standard recording.

By the above mentioned operation, a recording device of a preferred embodiment of the present invention can record images in the main-scanning direction and in the sub-scanning direction having a half size of the standard recording without losing information on the image. The preferred embodiment shown in FIG. 2 can also record images of an arbitrary magnification in the main-scanning direction and in the sub-scanning direction in an analogous way as above. For example, to record the image of n times in the main-scanning direction and in the sub-scanning direction, the number of rotations of the motor for driving the polygon mirror 13 should be set at $1/n$ times, the frequency of the clock signal for reading the image signal from the memory 24 at $1/n^2$ and the laser light strength at about n times. In addition, to record the image of n times in the sub-scanning direction and m times in the main-scanning direction, the number of rotations of the polygon mirror 13 should be set at $1/n$ times. The clock frequency for reading the image signal from the memory 24 at $1/mn$ times, the spot diameter of the laser beam at about $1/n$ times and the laser light strength at about n times.

In this description of the preferred embodiment of the present invention, it is not necessarily required to change the diaphragm 12 for deciding the spot diameter of the laser beam 3 according to the designated magnification of the image, but in this case the preferable size of the spot diameter of the laser beam is as follows.

Here it is defined that the light power distribution in the laser beam is a Gaussian distribution and its spot diameter should be defined at the point having $1/e^2$ of the central maximum power. Assume that a recording device is designed whose standard recording density is 16 lines/mm in the sub-scanning direction and the maximum recording density is 24 lines/mm in the sub-scanning direction. If the recording density is 24 lines/mm in the sub-scanning direction, the line width dimension d assigned for a single scanning line is $d = 1/24$ mm $= 42$ μm. It is preferable that the spot diameter R of the laser beam in the sub-scanning direction is $R = (1$ to $1.4)$ d so as not to lower the quality of the recorded images at the maximum recording density. Accordingly, images of a maximum recording density of 24 lines/mm in the sub-scanning direction and less can be recorded by using an optical system in which a diaphragm diameter is set to from a spot of the laser beam of R=1.2 d=50 μm and by changing the amount of light.

Figure 3:
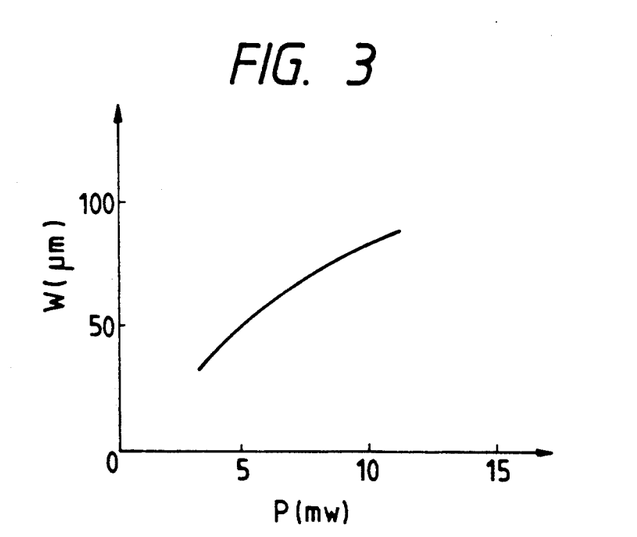
FIG. 3 is a diagram explaining the relationship between the laser output and the effective recording line length.

FIG. 3 shows an example of the relationship between an output P of the laser diode and the effective recording linewidth W when images are recorded using such an optical system. From FIG. 3 it can be seen that since the effective recording linewidth W can be changed in the range of 40 to 85 μm by changing the laser output P in the range of 4 to 10 mW, it can be applied to recording images with a recording density of 12 to 24 lines/mm.

In addition, if the magnification in the main-scanning direction and/or in the sub-scanning direction is changed, transmission of the image signal 23 for one screen to the device illustrated in FIG. 2 does not accord with the time required for image recording, and a capacity which is capable of recording the image signal for one screen can be needed as the capacity of the memory 24 used in the above mentioned preferred embodiment. However, in case the transmission time of the image signal for one screen accords with the printing time, the capacity of the memory 24 can be a capacity which is capable of storing information for one scanning line.

For example, when recording the image signal of size B4 transmitted by facsimile onto A4 size paper in a facsimile system, the transmission time of the image signal for one main-scanning line is substantially the same as the printing time, the capacity of memory 24 can be a capacity which is capable of storing information for at least one scanning line.

Next, a preferred shape of the diaphragm 12 used in the laser beam optical system is explained referring to FIGS. 4(a–d)

Figure 4A:
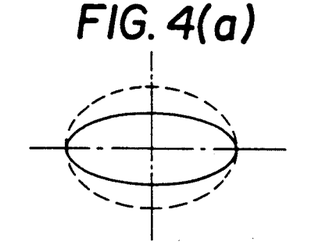

FIG. 4(a) shows an example of the shape of a diaphragm 12 and FIG. 4(a) shows an example of the shape of a spot on the photosensitive drum 1 in this case, and the change in the shape of the spot when the shape of the diaphragm 12 is changed as illustrated by a solid line and a dotted line. FIGS. 4(c) and (d) show other examples of diaphragm 12 shapes.

Figure 4B:
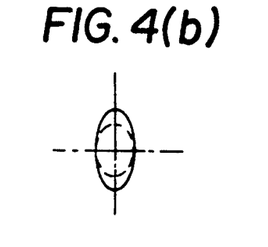
Figure 4C:
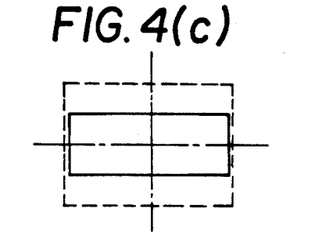
Figure 4D:
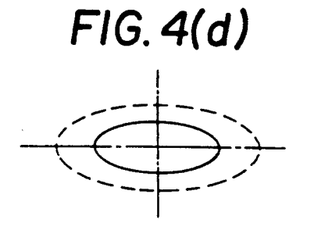
Figure 5:
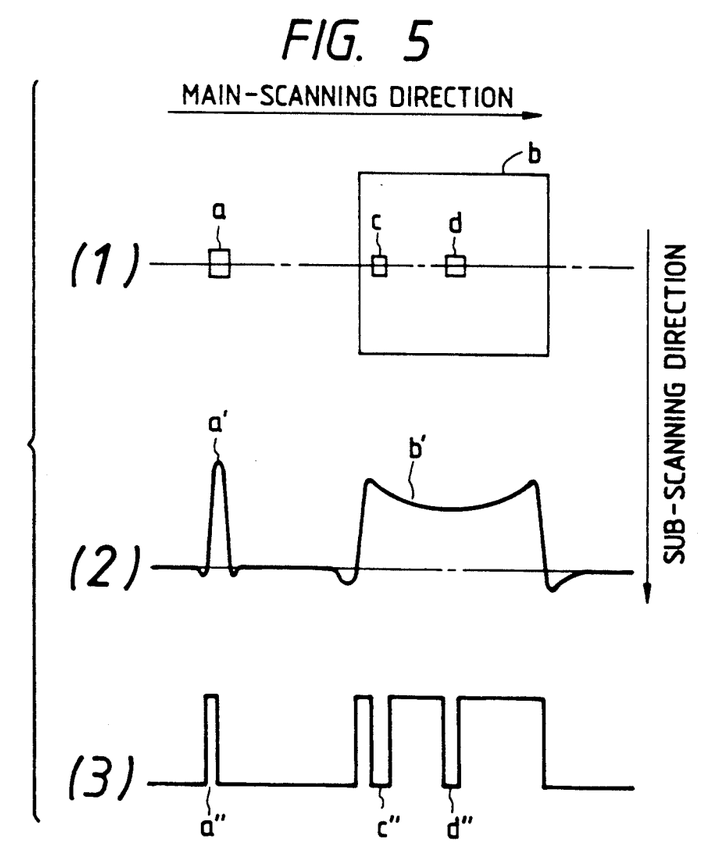

When the shape of the diaphragm is like that diaphragm with a crosswise oval, the spot is a longitudinal oval on the drum as shown by the solid line in FIG. 4(b). It is preferable that the long axis of such an oval spot be approximately the line width dimension d of the main-scanning line and that the short axis should be shorter as it is in the main-scanning direction. In addition, the solid line is used when the recording density is small and the dotted line is used when the recording density is larger. If a diaphragm with the shape shown in FIG. 4(a) is used, the length in the vertical direction of the spot, that is, in the sub-scanning direction can be changed according to the recording density, and it becomes possible to record using a longitudinal spot corresponding to the recording density. A variation of the diaphragm of FIG. 4(a) shown in FIG. 4(c) has the characteristics that a spot shape similar to that in FIG. 4(b) can be obtained and it is easy to determine the shape of the diaphragm. The example of the diaphragm shown in FIG. 4(d) is the optimum shape. Since the shape of the spot on the photosensitive drum 1 is changed at the same rate not only in the sub-scanning direction but also in the main-scanning direction, it becomes possible to record images whose balance of resolving performance both in the main-scanning and sub-scanning directions is not lost.

Next, the adjustment function of output of the laser diode 10 in the above mentioned preferred embodiment is explained.

It was described above that if the magnification of the recording images is changed, it is necessary to change the laser output, and this function is carried out by the light control circuit 27, which controls the laser driver 28 and the action point of the laser diode 10. This light control can be carried out by a combination of the image contents and magnification, and in this case, a better recording result can be obtained. This is explained in the following referring to FIG. 5.

FIG. 5 (1) shows an example of a printed image on a white paper with black toners in which a is a black (print) image of a small area, b is a black image of a larger area, c and d are white (non-print) images in the black image b of a large area. In addition, the dimensional relationship as an image signal of the images a, c and d should have been printed or recorded at the same size, even if there is a difference in whether they are black images or white images. However, when they are actually recorded, the dimensional relationship becomes different as shown in FIG. 5 (1) in such a manner that the image a is a little larger than the dimensions calculated from the image signal, the image c is smaller than the dimensions calculated and the image d has almost the same dimension as the calculated image. This is due to the property inherent in electrophotography by which a latent charge image formed on a photo conductive sensitizing layer on the photosensitive drum 1 is developed by toners. Namely, the electrophotographic record is developed by sucking toner which has been electrified in an electric field formed in a development space by a charge latent image. And the development result is a toner image which is somewhat different from the charge image, and this becomes the recorded image.

FIG. 5 (2) shows the strength distribution of the electric field formed in the development space. FIG. 5 (2) a' and b' show the electric field corresponding to images a and b in FIG. 5 (1), and electric field a' is large but the electric field strength at the central part of the electric field b' is weakened. Thus, since the electric field strength generated by the charge latent image has an area effect and a peripheral effect, images with sizes of about 0.1 mm to 1 mm are developed dark and the line width tends to be broader. Consequently, images with a large area have a tendency to be dark at the periphery and light at the central part. Accordingly, when a white image like images c and d is recorded in a large area like image b, the peripheral area of the white image c is developed by the toner and the image becomes smaller than the white image which should have been printed. FIG. 5 (3) shows a method to solve such a phenomenon and a pulse wave form which modulates the emission of the laser diode 10. a", c" and d" are pulses corresponding to images a, c and d shown in FIG. 5 (1). As the image a is broader than the original image by the image signal, pulse width (ON) of the pulse a" is converted so that it becomes narrower than the transmitted image signal, and as the white width of the image c is narrower, pulse width (OFF) of the pulse c" is converted so that it becomes broader than the transmitted image signal. As the image d is similar to the transmitted image signal, the pulse d" is not converted and remains as the original signal. If the light of the laser diode is controlled using a pulse in this way, the recorded image becomes truer to the transmitted image signal.

Actually, in order to carry out the above mentioned signal conversion, it is necessary to judge the contents of the image signal to be recorded and to convert the signal in compliance with a prescribed rule. In the preferred embodiment of the present invention shown in FIG. 2, the image discrimination circuit 26 discriminates the recorded contents of the dot on which scanning exposure is carried out, controls the light control circuit 27 based on the result and controls the emission output of the laser diode 10. This image discrimination circuit 26 judges whether it is a black image or a white image using the image information around the dots to be recorded, and reduces the amount of light or the pulse width if it is a black image of a fine line, generates a prestored command to increase the pulse width (OFF) if it is a white image of a fine line and controls the light circuit 27.

It is necessary to know at least the number of dots, $3 \times 3 - 1 = 8$, positioned around the recorded dot. Therefore, the image discrimination circuit 26 is constituted by being provided with a memory for storing information belonging to the scanning lines in front of and behind the recording, a means for extracting the information of the peripheral 8 dots from them and a table for discrimination the contents of the extracted information. The information needed to discriminate the image contents is, as explained in FIG. 5 (2), about +2.5 mm square around the dot since the recording density of the recorded image is changed with the change of electric field strength in a square of 1 to 5 mm. Therefore, the image discrimination circuit 26 is constituted so that a memory which is capable of storing information for about 100 scanning lines is provided, information in a square of about 12.5 mm around the dot is extracted from said memory and the images are discriminated by this information. In addition, when the magnification in the main-scanning and sub-scanning directions are changed, the information included around the dot to be recorded is also changed, and it is desirable not simply to discriminate images from the information of a certain number of dots around the dot to be recorded, but to discriminate images from the information included in a certain area around the dot. To implement this, the image discrimination circuit 26 should be constituted so that it is interlocked with the longitudinal and lateral magnification designation signals 17 and 18 to increase or decrease the number of peripheral dots needed to discriminate the images. That is, image discrimination is carried out so that the recording image is to be reduced, the image discrimination circuit 26 increases the number of peripheral dots, and when it is enlarged, it decreases the number of peripheral dots needed for image discrimination.

As mentioned above, the preferred embodiment shown in FIG. 2 records the image true to the input image signal by controlling the emission of the laser diode according to the condition and image around the images which have been judged to be recorded by the image discrimination circuit 26 and by increasing or decreasing the effective amount of light received by the photo conductive layer on the photosensitive drum 1. As explained referring to FIG. 5, this effective amount of light can be controlled by changing the pulse width of the laser diode 10 or by changing the emission strength.

Figure 6:
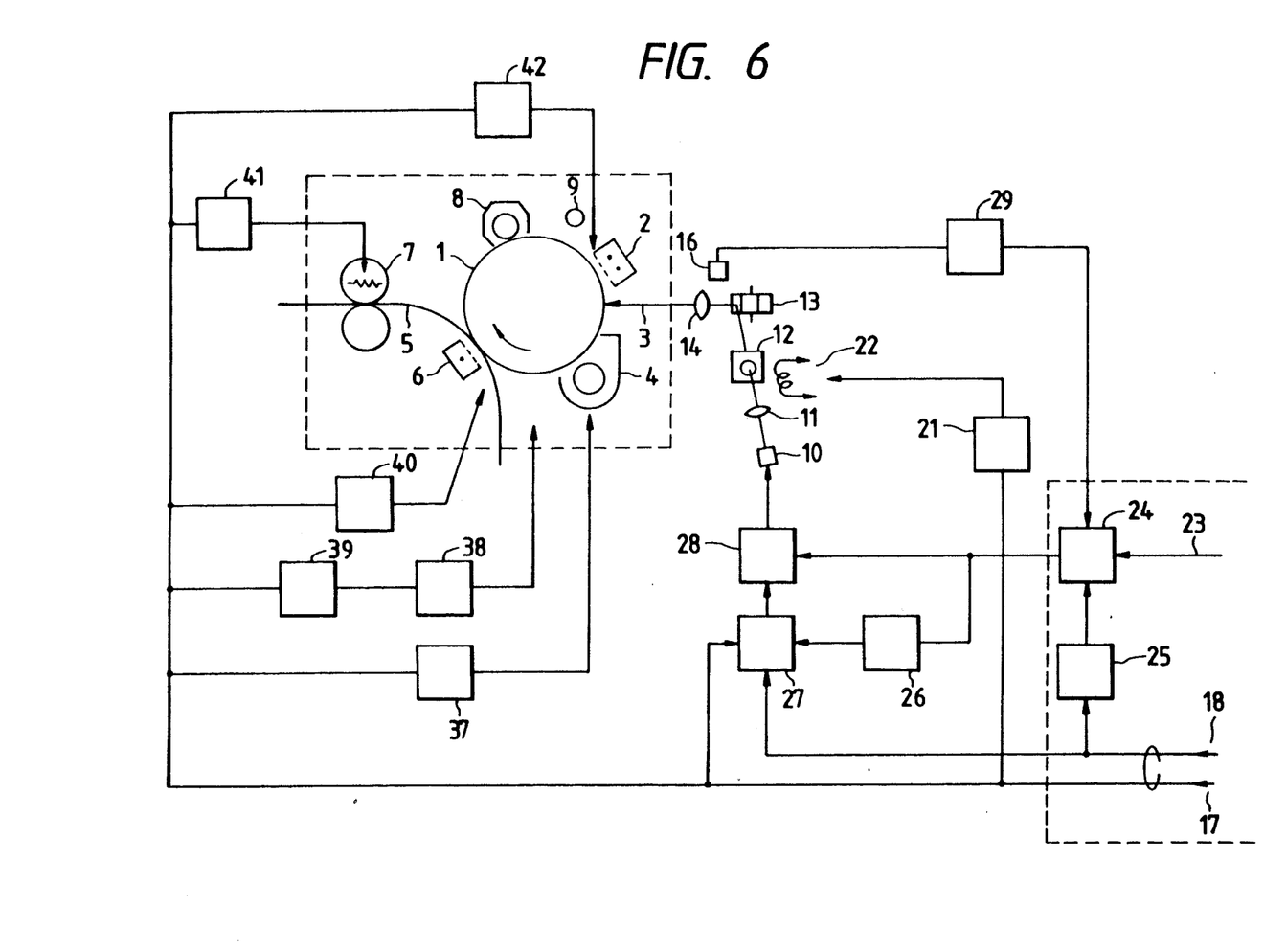
FIG. 6 is a block diagram showing the configuration of another preferred embodiment.
Figure 7:
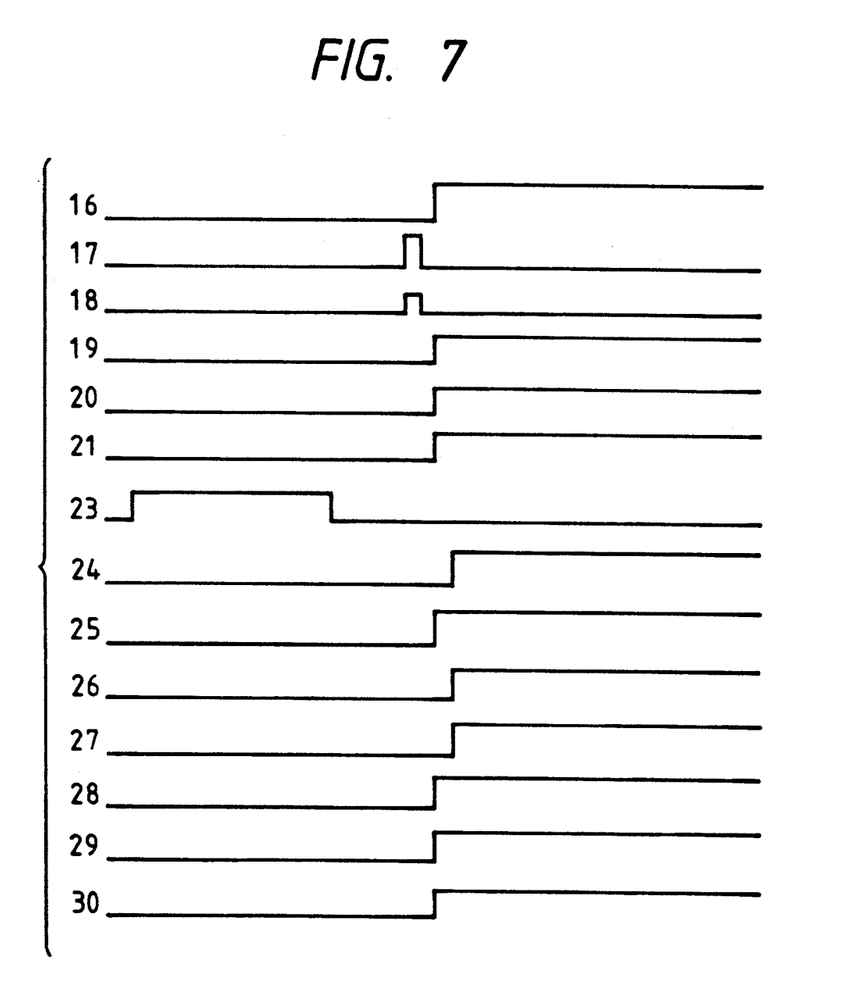
FIG. 7 is a diagram showing examples of timing charts for the signals in FIG. 1, and FIGS. 8A, 8B and 8C are diagrams showing examples of the printed image according to the image signal.

FIG. 6 is a black diagram showing the configuration of another preferred embodiment of the present invention.

In FIG. 6, a third variable frequency generating source, such as a developer driving setting circuit 37 receives the longitudinal magnification designation signal 17 and outputs a control signal to the developer 4. A motor driver circuit 38 for driving a motor of the photosensitive drum 1 and a paper driver motor receives a signal generated by a fourth variable frequency generating source, such as a motor driving power source oscillation circuit 39 which receives the longitudinal magnification designation signal 17. A transfer voltage adjusting circuit 40 for controlling the fixer 7 and an electrified voltage adjusting circuit 42 for controlling the charger 2 receive the longitudinal magnification designation signal 17. The other means in FIG. 6 are designated with the same number as in FIG. 2.

In the embodiment shown in FIG. 6, the speed in the main-scanning direction of the laser beam 3, that is, the number of polygon mirror 13 rotations is substantially constant, and conversion of the image size is carried out by changing the magnification or the recording density in the main-scanning direction by changing the image signal reading clock frequency the same as the embodiment shown in FIG. 2, and by changing the magnification in the sub-scanning direction or the recording process speed (sub-scanning speed), that is, that the rotational speed of the photosensitive drum 1 is changed.

In the preferred embodiment shown in FIG. 6 the image signal 23 is, as in the case of the embodiment shown in FIG. 2, after being stored once in the memory 24, read out of the memory 24 so that the main-scanning direction timing read out of the memory 24 is decided and the starting position of the recording is set by the beam detector signal so that the detection output signal from the beam detector 16 is amplified and shaped in the beam detector signal shaping circuit 29. This reading of the memory 24 is carried out according to the clock signal from the image reading clock signal generating circuit 25 in which its frequency is controlled based on the lateral magnification designation signal 18. If the magnification of the image designation by the lateral magnification designation signal 18 instructs a 1/n reduction of the standard recording in the main-scanning direction, the frequency of the clock generating circuit 25 is set at n times the standard recording. Moreover, the light control circuit 27 sets the light level of the laser diode 10 through the laser driver 28 according to the magnification signal 18. This amount of light is adjusted, as explained in the preferred embodiment shown in FIG. 2, not only by the lateral magnification designation signal 18 but also by the longitudinal magnification designation signal 17 and the image discrimination circuit 26. Emission conditions of the laser diode 10 are decided by them, and the laser driver 28 modulated the emission of the laser diode 10 by the image signal read out of the memory 24. The spot diameter of the laser beam 3 is, as in the case of the preferred embodiment shown in FIG. 2, controlled by the spot diameter switching circuit 21. The storage capacity of the memory 24 can correspond to the maximum number of dots for one scanning line as the main-scanning speed of the laser beam 3 is constant, and can be extremely small compared to the preferred embodiment shown in FIG. 2. Of course, recording can be carried out by preparing the memory for one screen and accumulating the image signal for one screen.

As conversion by magnification the sub-scanning direction is carried out by changing the processing speed, it is necessary to change the constant of the recording device in compliance with it to obtain a constant visual quality.

Therefore, the preferred embodiment shown in FIG. 6 is capable of changing the circumferential speed of the photosensitive drum 1, the speed of the recording paper 5 and so forth. This is controlled by controlling the frequency of the driving motor for the power source oscillation circuit 39 by the longitudinal magnification designation signal 17, driving the motor driving circuit 38 based on this frequency and by changing the number of rotations of the driving motor of the photosensitive drum 1 and of the driving motor for the recording paper 5 by this amount. For example, if the longitudinal magnification designation signal 17 instructs reduction of the image recording to 1/m of the standard recording in the sub-scanning direction, the above mentioned rotational speed of the driving motor is 1/m.

On the other hand, the charger 2 for electrifying the surface of the photosensitive drum 1 at an approximately constant voltage regardless of the drum's circumferential speed. Therefore, when a charger with a grid is used for the charger 2, the electrifying voltage adjusting circuit 42 is capable of easily electrifying a constant electrifying voltage on the surface of the photosensitive drum 1 by adjusting the voltage imposed on the grid of the charger 2 by the longitudinal magnification designation signal 17. In addition, conditions of the developer 4 are changed by the longitudinal magnification designation signal 17. Namely, the developer driving setting circuit 37 controls the number of development roll rotations and a bias voltage based on the longitudinal magnification designation signal 17 so that optimum development can be carried out by the developer 4.

Moreover, the conditions of the transferror 6 for transferring the toner image formed on the surface of the photosensitive drum 1 to the recording paper 5 need to be changed according to the longitudinal designation signal 17 in order to give an approximately constant transfer voltage on the recording paper 5. Therefore, as in the case of controlling the charger 2, the transfer voltage adjusting circuit 40 controls the voltage imposed on the grid of the transferror with grid 6 according to the longitudinal magnification designation signal 17 so that the transferror 6 can obtain a stable transfer property. The temperature of the fixer 7 for fixing the toner image transferred to the recording paper 5 also needs to be controlled based on the speed of the recording paper, that is, the longitudinal magnification designation signal 17 so that a constant fixing property can be obtained. Therefore, the fixing temperature adjusting circuit 41 controls the fixer 7 based on the longitudinal magnification designation signal 17 so that the fixing temperature is lowered when the process speed is slow.

According to the above mentioned preferred embodiment of the present invention, images of an arbitrary magnification or recording density can be recorded on the recording paper independent of the original image signal without loosing information.

In the explanation of the preferred embodiments of the present invention shown in FIGS. 2 and 6, the memory 24 for the image signal and the image reading clock generating circuit 25 is provided in the recording device, but it can be provided in the original signal source device at the side where the image signal is generated as divided by the dotted lines in FIGS. 2 and 6. In addition, it is necessary for the preferred embodiment of the present invention to change the power source frequency for changing the number of rotations of the motor for driving the polygon mirror 13, the image reading clock frequency or the driving power source frequency for the motor to change the processing speed based on the longitudinal or the lateral magnification designation signal 17 or 18, but these changes can be easily carried out by providing a fixed oscillator which only needs switching and selecting (for example, a crystal oscillator) or by adopting a method such as using a variable frequency oscillator circuit.

In addition, the present invention can be constituted by combining the two above mentioned preferred embodiments in FIGS. 2 and 6, and in this case, it becomes possible to convert the magnification of the image over a wider range and moreover, to extend the selecting range of constitutional parts in designing the device.

The above mentioned preferred embodiments of the present invention have been explained as an image recording device of the optical scanning type using electrophotography, but the present invention can also be applied to a device which records on a photosensitive recording material, for example, silver halide sensitizing material and so forth by scanning the light beam spot.

As explained above, according to the present invention, since the recording density in the main-scanning direction and recording density in the sub-scanning direction can be changed by changing the scanning speed of the laser beam, the image reading clock frequency in the main-scanning direction or the process speed, independent of the proceeding density of the image dot, recording on the desired screen dimension or conversion of the recording line density (dot density) can be carried out without loosing information on the original image.

I claim:

1. An image recording device of an optical scanning type utilizing a photosensitive drum comprising:
   at least two variable frequency generating sources, means for converting and recording an original image into an image of at least one of a different arbitrary size or recording line density on a recording material by controlling the frequencies generated by at least one of the at least two variable frequency generating sources according to a magnification or the line density of the image to be recorded so as to change at least one of the recording density in a main-scanning direction of an optical beam and the recording density in a sub-scanning direction of the optical beam, one of the at least two variable frequency generating sources generating a frequency for controlling scanning speed in the main-scanning direction, and another of the at least two variable frequency generating sources generating a frequency for controlling a driving speed of the photosensitive drum or a characteristic of the optical beam.

2. An image recording device according to claim 1, wherein the original image is recorded by controlling the frequency generated by the at least two variable frequency generating sources according to the magnification or the line density of the image to be recorded, changing the recording density in the main-scanning direction of the optical beam with the one of the variable frequency generating sources and by changing the recording density in the sub-scanning direction with the another of the variable frequency generating sources.

3. An image recording device according to claim 2, wherein the one of the variable frequency generating sources controls the transmission speed of an image to change the recording density in the main-scanning direction and the another of the variable frequency generating sources controls the main-scanning speed of the optical beam to change the recording density in the sub-scanning direction.

4. An image recording device according to claim 2, wherein the one of the variable frequency generating sources controls the transmission speed of an image signal to change the recording density of the optical beam in the main-scanning direction and the another of the variable frequency generating sources controls the speed of the recording material in the sub-scanning direction.

5. An image recording device according to claim 4, wherein the image recording device includes a memory for storing an image signal and wherein the stored image signal is read out by the one of the variable frequency generating sources to control the optical beam and the recording density in the main-scanning direction.

6. An image recording device according to claim 5, wherein the memory capacity of said memory is capable of storing information corresponding to at least one main-scanning line.

7. An image recording device according to claim 1, wherein the means for converting and recording include means for changing a shape of a spot of the optical beam for recording of the image on the recording material in accordance with the magnification or the line density of the image to be recorded.

8. An image recording device according to claim 1, wherein the means for converting and recording include means for modulating an emission of a laser diode for forming the optical beam in accordance with an image to be recorded being a white image or a black image.

9. An image recording device according to claim 1, wherein the photosensitive drum is rotatable and means are provided for exposing a surface of the photosensitive drum with the optical beam for enabling image recording while the driving speed for rotation of the photosensitive drum is controlled so as to control the scanning speed in the sub-scanning direction.

10. A data processing apparatus comprising:
an original signal source of producing an original image signal corresponding to the original image, and a signal identifying at least one of a magnification and a line density of the original image signal to be recorded on the recording material; and an image recording device of an optical beam scanning type utilizing a photosensitive drum including at least two variable frequency generating sources, means for converting and for recording an original image into an image of an arbitrary size or recording line density different from the original image signal on a recording material by controlling a frequency generated by at least one of the at least two variable frequency generating sources according to the signal identifying at least one of the magnification and the line density of the image to be recorded so as to change at least one of the recording density in a main-scanning direction of an optical beam and the recording density in a sub-scanning direction of the optical beam, one of the at least two variable frequency generating sources generating a frequency for controlling scanning speed in the main-scanning direction, and another of the at least two variable frequency generating sources generating a frequency for controlling a driving speed of the photosensitive drum or a characteristic of the optical beam.

11. A data processing apparatus according to claim 10, wherein the photosensitive drum is rotatable and means are provided for exposing a surface of the photosensitive drum with the optical beam for enabling image recording while the driving speed for rotation of the photosensitive drum is controlled so as to control the scanning speed in the sub-scanning direction.

12. A data processing apparatus according to claim 10, wherein the original image is recorded by the controlling the frequency generated by at least two variable frequency generating sources according to the magnification or the
line density in the main-scanning direction of the optical beam with the one of the variable frequency generating sources and by changing the recording density in the sub-scanning direction with the another of the variable frequency generating sources.

13. A data processing apparatus according to claim 12, wherein the one of the variable frequency generating sources controls the transmission speed of an image signal to change the recording density in the main-scanning direction and the another of the variable frequency generating sources controls the main-scanning speed of the optical beam to change the recording density in the sub-scanning direction.

14. A data processing apparatus according to claim 12, wherein the one of the variable frequency generating sources controls the transmission speed of an image signal to change the recording density of the optical beam in the main-scanning direction and the another of the variable frequency generating sources controls the speed of the recording material in the sub-scanning direction.

15. A data processing apparatus according to claim 14, wherein the image recording device includes a memory for storing an image signal and wherein the stored image signal is read out by the one of the variable frequency generating sources to control the optical beam and the recording density in the main-scanning direction.

16. A data processing apparatus according to claim 15, wherein the memory capacity of the said memory is capable of storing information corresponding to at least one main-scanning line.

* * * * *